C. Lounsberry,
Apple Cutter.
N° 21,141.   Patented Aug. 10, 1858.
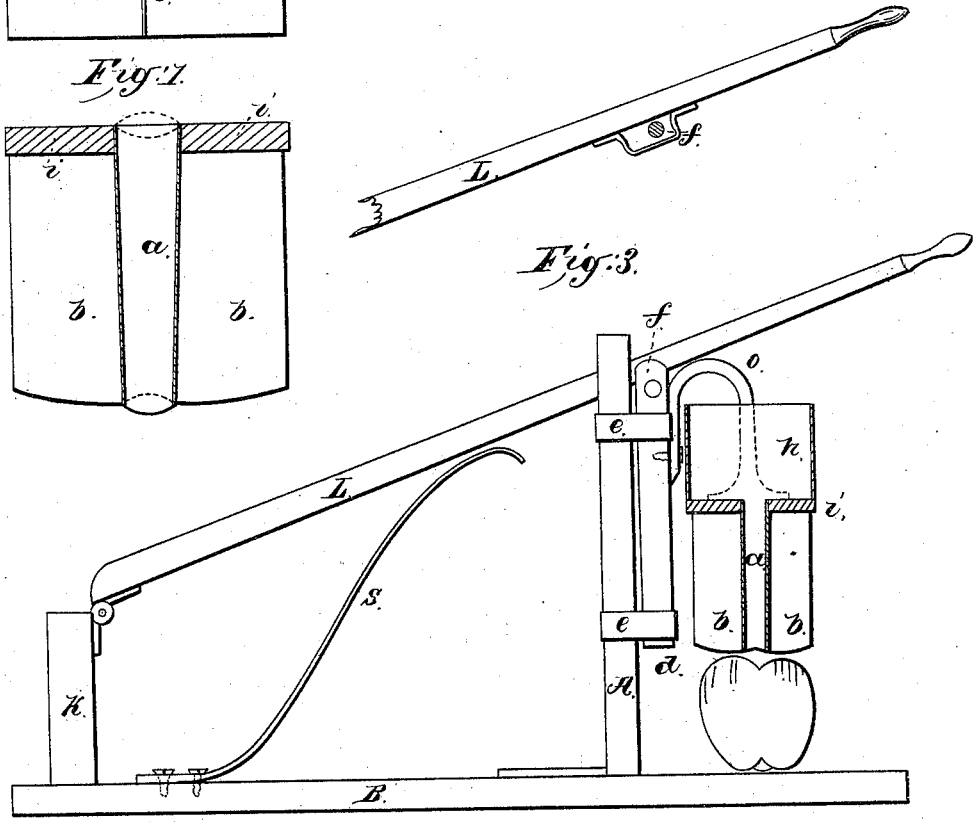

UNITED STATES PATENT OFFICE.

CHAS. LOUNSBERRY, JR., OF NICHOLS, NEW YORK.

MACHINE FOR CORING AND QUARTERING APPLES.

Specification of Letters Patent No. 21,141, dated August 10, 1858.

*To all whom it may concern:*

Be it known that I, CHARLES LOUNSBERRY, Jr., of the town of Nichols, in the county of Tioga and State of New York, have invented a certain new and Improved Machine for Coring and Quartering Apples; and I do hereby declare that the following is a full, clear, and exact description of the same, reference being had to the accompanying drawings, making a part of this specification.

The nature of my invention consists in so arranging and combining a cup or receptacle for the cores as they are cut with a lever operating the cutting blades and coring tube that the cores may be kept separate from the quartered apples and thus dispense with the labor consequent to other machines worked with a lever, where this feature does not exist.

Figure 3 is an elevation of the machine; Fig. 2, a transverse section of the knife as enlarged; Fig. 1, a longitudinal view of the same.

($a$) is a tube of thin metal formed slightly tapering.

($b\ b$) are blades of sufficient length and breadth to cut through an apple. They are connected with and radiate from the tube ($a$). Four blades are shown, but more or less may be employed.

($i\ i$) is a piece of thin metal having a hole in its center corresponding with the diameter of the tube ($a$). The tube and blades are firmly united with ($i\ i$).

($h\ h$) is a cup also united with the step ($i\ i$) in which the cores of the apples are received.

B is a board or base from which rises the post (K) to which the lever or handle L is attached by a suitable hinge.

A is an upright also rising from B.

($d$) is square bar of metal provided with bands ($e\ e$) which pass around A so as to admit of ($d$) moving up and down guided on A.

($o$) is a bent arm of metal attached by screws to ($d$) and firmly united to the stop ($i$).

($f$) is bolt projecting at right angles from the bar ($d$).

A strap or loop of metal attached to the lower side of the lever L passes around the bolt ($f$) by which the cutters and tube of the machine are operated.

$s$, is a spring beneath the lever to elevate the knife from the board.

To operate this machine place an apple on the board with its core directly underneath the tube of the knife as seen in Fig. 3, and with the hand bring the lever down till the knife cuts through the apple to the board $b$. By this operation a round core is cut out of the apple and passes upward through the tube of the knife into the cup $h$, $h$, while the rest of the apple is cut in quarters and remains on the board $b$.

I am aware that the knife with a handle attached has been operated before now by hand and therefore do not claim it.

What I do claim as my invention and desire to secure by Letters Patent is—

The combination and arrangement of the knife with the movable step $i$, $i$, the standard A, with its attachment $d$, the cup $h$, $h$, and spring S, being substantially made as herein described and for the purpose set forth.

CHARLES LOUNSBERRY, JR.

Witnesses:
 PETER G. BRINK,
 BURNACE BEEBE.